(12) United States Patent
Pham et al.

(10) Patent No.: US 9,767,604 B2
(45) Date of Patent: Sep. 19, 2017

(54) IMAGE ANALYSIS METHOD BY ANALYZING POINT CLOUD USING HIERARCHICAL SEARCH TREE

(71) Applicant: Kabushiki Kaisha Toshiba, Minato-ku (JP)

(72) Inventors: Minh-Tri Pham, Cambridge (GB); Riccardo Gherardi, Cambridge (GB); Frank Perbet, Cambridge (GB); Bjorn Stenger, Cambridge (GB); Sam Johnson, Cambridge (GB); Oliver Woodford, Cambridge (GB); Pablo Alcantarilla, Cambridge (GB); Roberto Cipolla, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 34 days.

(21) Appl. No.: 14/807,248

(22) Filed: Jul. 23, 2015

(65) Prior Publication Data

US 2016/0027208 A1 Jan. 28, 2016

(30) Foreign Application Priority Data

Jul. 25, 2014 (GB) .................................. 1413245.0

(51) Int. Cl.
*G06K 9/00* (2006.01)
*G06T 17/00* (2006.01)
(Continued)

(52) U.S. Cl.
CPC ............ *G06T 17/005* (2013.01); *G06T 5/001* (2013.01); *G06T 7/66* (2017.01); *G06T 2207/10028* (2013.01)

(58) Field of Classification Search
CPC ....... G06T 17/005; G06T 7/606; G06T 5/001; G06T 2207/10028
(Continued)

(56) References Cited

U.S. PATENT DOCUMENTS

2006/0184519 A1* 8/2006 Smartt .............. G06F 17/30241
2015/0049944 A1* 2/2015 Bamba .............. G06F 17/30241
382/171

FOREIGN PATENT DOCUMENTS

EP 0 152 741 A2 8/1985
EP 0 152 741 B1 9/1995

OTHER PUBLICATIONS

Combined British Search and Examination Report issued Jan. 26, 2015 in British Application 1413245.0, filed on Jul. 25, 2014.
(Continued)

*Primary Examiner* — Andrew Moyer
(74) *Attorney, Agent, or Firm* — Oblon, McClelland, Maier & Neustadt, L.L.P.

(57) ABSTRACT

A method of object recognition and/or registration includes receiving a point cloud, arranging the points of the point cloud into a hierarchical search tree, and determining geometric information of the points located within a region, by identifying a highest level tree nodes where all of descendent leaf nodes are contained within the region and selecting the leaf nodes for the points where no sub-tree is entirely contained within the region, such that the points falling within the region are represented by the smallest number of nodes and performing statistical operations on the nodes representing the points in the region. The geometric information includes descriptors of features in the point cloud. The method further includes comparing the feature descriptors with a database of feature descriptors for a plurality of objects.

18 Claims, 11 Drawing Sheets

(51) Int. Cl.
G06T 5/00 (2006.01)
G06T 7/66 (2017.01)

(58) Field of Classification Search
USPC .................................. 382/103, 171; 707/737
See application file for complete search history.

(56) References Cited

OTHER PUBLICATIONS

Yu Zhong "Intrinsic Shape Signatures: A Shape Descriptor for 3D Object Recognition", 2009 IEEE 12th International Conference on Computer Vision Workshops, 2009, 8 pages.

Carlo Tomasi et al. "Shape and Motion from Image Streams: A Factorization Method—Part 3, Detection and Tracking of Point Features", Technical Report CMU-CS-91-132, Carnegie Mellon University, Apr. 1991, 38 pages.

B. Steder et al. "NARF: 3D Range Image Features for Object Recognition", In Workshop on Defining and Solving Realistic Perception Problems in Personal Robotics at the IEEE/RSJ International Conference on Intelligent Robots and Systems (IROS), 2010, 3 pages.

Minh-Tri Pham et al. "A New Distance for Scale-Invariant 3D Shape Recognition and Registration", 2011 IEEE International Conference on Computer Vision, 2011, 8 pages.

Chris Harris et al. "A Combined Corner and Edge Detector", The Plessey Company plc, 1988, 5 pages.

D. J. R. Meagher "Octree Encoding: A New Technique for the Representation, Manipulation and Display of Arbitrary 3-D Objects by Computer", Rensselaer Polytechnic Institute, Image Processing Laboratory, 1980.

Joe Louis Bentley "Multidimensional Binary Search Trees Used for Associative Searching", Communications of the ACM, vol. 18, No. 9, Sep. 1975, 9 pages.

Torsten Fiolka et al. "SURE: Surface Entropy for Distinctive 3D Features", In Proceedings of Spatial Cognition 2012, Sep. 2012, 20 pages.

Alex Flint et al. "Thrift: Local 3D Structure Recognition", Digital Image Computing Techniques and Applications, Dec. 2007, 7 pages.

"Toshiba CAD Model Point Clouds Dataset", Cambridge Research Laboratory, Toshiba Research Europe Ltd, 2012, 4 pages.

* cited by examiner

IMAGE ANALYSIS METHOD BY ANALYZING POINT CLOUD USING HIERARCHICAL SEARCH TREE

FIELD

Embodiments of the present invention as described herein are generally concerned with the image analysis methods and systems.

BACKGROUND

Many computer vision and image processing applications require the ability to calculate statistical measures of a group of points from a 3D point cloud. One example is the detection of features of a 3D point cloud.

Features provide a compact representation of the content of a scene represented by a 3D point cloud. They describe only local parts of the scene and, hence, over robustness to clutter, occlusions, and intra-class variation. For such properties, features are a favourable choice for problems like object recognition and registration, scene understanding, camera calibration and pose estimation. When the data is large (i.e. captured from a large-scale reconstruction method or a laser scanner), feature-based approaches have an advantage in efficiency over point-based approaches because the number of features are much smaller than the number of points.

Applications of feature-based approaches for 3D computer vision are ubiquitous. These include, but not limited to: object recognition and registration, mobile robots, navigation and mapping, augmented reality, automatic car driving, scene understanding and modelling.

One of the goals of 3D object recognition is the real-time detection of objects in a scene. This technology is one of the key technologies for building CAD models from 3D data. Other application examples are in navigation, mobile robotics, augmented reality, and automatic manufacturing. Detection from a 3D point cloud obtained from the camera is a difficult task, since only a partial view of the scene is available. Humans recognize objects with little effort. However, this is still a challenge in computer vision, especially with limited time resources.

One important step in 3D object recognition is to find and extract features, i.e. salient regions in the scene which can be used to estimate the location and the orientation of an object. Feature extraction is also useful for other tasks: e.g. point cloud registration and object tracking.

DETAILED DESCRIPTION OF THE DRAWINGS

Figure 1:
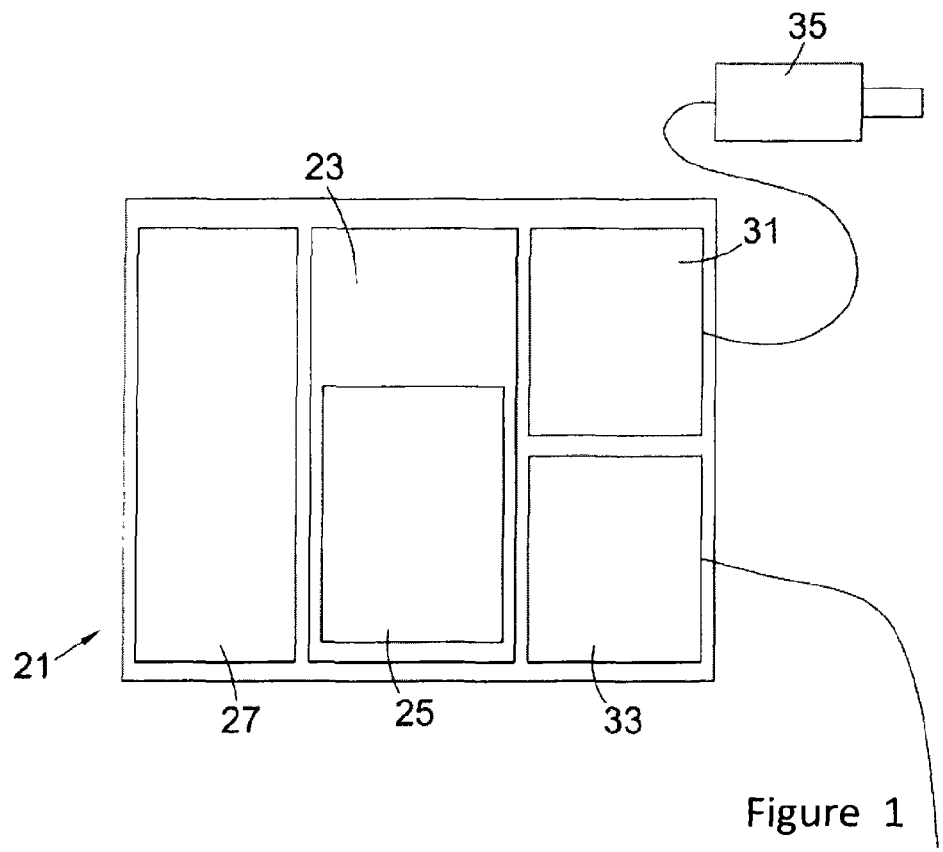
FIG. 1 is a schematic of a computer vision system adapted to perform a method in accordance with an embodiment of the present invention.

According to an embodiment, a method for analysing a point cloud is provided, the method comprising:

receiving a point cloud, comprising a plurality of points, each point representing a spatial point in an image;

arranging the points into a hierarchical search tree, with a lowest level comprising a plurality of leaf nodes, where each leaf node corresponds to a point of the point cloud, the search tree comprising a plurality of hierarchical levels with tree nodes in each of the hierarchical levels, the nodes being vertically connected to each other though the hierarchy by branches, wherein at least one moment of the property of the descendant nodes is stored in each tree node; and determining geometric information of the points located within a region, by identifying the highest level tree nodes where all of the descendent leaf nodes are contained within the region and selecting the leaf nodes for the points where no sub-tree is entirely contained within the region, such that such that the points falling within the region are represented by the smallest number of nodes and performing statistical operations on the nodes representing the points in the region, the statistical measures being determined from the moments of the properties stored within the identified tree nodes.

The above method represents a set of points as a set of tree nodes, where the tree is constructed from the 3D point cloud. The region may be a 3D ball region, in this example, the method finds a set of all points of the point cloud that locate inside a ball region and returns the set as a set of tree nodes. The set of points found by the method can be exact or approximate.

To calculate, for example, the mean of positions, it is necessary to compute the mean of all of the points which fall within the region. In the above method, if it desired to calculate the mean of positions, when the search tree is built, the mean of the positions of all descendant nodes of a tree node are stored in each tree node. The mean of the positions being the $1^{st}$ order moment of the positions, where the positions are the property. When the geometric information is computed, it is, where possible, calculated using the values of the means stored in the tree nodes. Thus, the method does not calculate the mean for each of the points every time. The values from the leaf nodes themselves are only used when a tree node cannot be identified where all of its descendant nodes lie within the region. A group of points will be described by the highest level tree node from which the points descend. If some of the points that descend from a tree node are outside the region then that tree node cannot be used, and a lower level tree node is sought.

The property may be at least one selected from position, normal vector, colour, curvature, intensity or transparency.

The geometric information may be one or more selected from: number of points; mean of positions; mean of colour; mean of normal vectors; mean of intensity; covariance of positions; covariance of normal vectors; covariance of colour; variance of curvature; and variance of intensity.

The moments may be selected from 0th order, $1^{st}$ order, $2^{nd}$ order, or any higher order moments.

In an embodiment, the method is configured to filter the point cloud by replacing the position of every point in the point cloud with the mean of its neighbouring points, the neighbouring points falling within a distance defined by the said region, wherein the geometric information is the mean of the neighbouring points.

In one embodiment, the method is used for filtering a point cloud, here the zeroth order and first order moments of the position of the points are stored in the said nodes, the method being configured to filter the point cloud by replacing the position of every point in the point cloud with the mean of its neighbouring points, the neighbouring points falling within a distance defined by the said region, wherein the geometric information is the mean of the neighbouring points calculated from the stored zeroth order and first order moments.

In a further embodiment, the geometric information is the number of points within a region, the method further comprising estimating the density of the point cloud using the number of points in a region divided by the size of the region.

In a further embodiment, the method is used for determining the number of points within a region. Here, the zeroth order moments of the position of the points are stored in the said nodes and the geometric information is the number of points within a region, the method further comprising estimating the density of the point cloud using the number of points in a region from the stored zeroth order moments divided by the size of the region.

The method may also be used when determining the normal to the surface at a point or point, here, the zeroth order, first order and second order moments of the position of the points may be stored in the said nodes and the geometric information is the normal vector of a selected point on the point cloud, the normal vector being determined by calculating the covariance matrix of the points within a region around the selected point from the moments stored within the nodes and the method further comprising determining the normal from the $3^{rd}$ eigenvector of the covariance matrix.

The orientation of the surface at a point or a subset of points may be determined by storing the zeroth order, first order and second order moments of the position of the points in the said nodes and the geometric information is the orientation of the surface of a point cloud at a selected point, the orientation being determined by calculating the covariance matrix of the points within a region around the selected point from the moments stored within the nodes and deriving the orientation from the 3 eigenvectors of the covariance matrix.

In an embodiment, the above method is used for feature detection. During feature detection, it is necessary to compute geometric information from a number of points in a region. Many types of feature detectors use the covariance of either the position or the surface normals. The covariance can be computed from the $0^{th}$, $1^{st}$ and $2^{nd}$ order moments and these moments can be stored in the tree nodes when the tree is constructed. These stored moments can be retrieved from the tree nodes during feature detection to avoid the need to calculate the moments using each of the descendant nodes when determining the covariances.

The ability to calculate the covariance matrix has many applications in determining feature locations and also feature descriptors. Here, the zeroth order, first order and second order moments of the position of the points may be stored in the said nodes and the geometric information is the location of a feature in the point cloud, the method further comprising calculating the covariance matrix from the moments stored within the nodes for the points in a region defined around a selected point and determining a score from an eigenvalue of said covariance matrix, wherein features are deemed to be located at selected points on the basis of their score.

In an embodiment, the covariance matrix has three eigenvalues and the lowest eigenvalue is assigned as the score. In a further embodiment, said region is a first ball having a first radius, and a selected point is analysed by constructing a first ball and a second ball having a second radius around said point, where the second radius is larger than the first radius, wherein each of the points in the point cloud within the second ball for a selected point are analysed by constructing first balls around these points and calculating the score for each point. Here, the feature location may be determined to be at the point with the largest score calculated for said first ball.

In the above, the descriptor may be derived as the first ball and the 3D orientation for the first ball determined for the point where the feature is located.

However, the covariance matrix may also be used to determine other descriptors known in the art and these can be computed using the covariance from the above analysis method.

This can then be used for object recognition/registration where the extracted features from an unknown scene are compared with a database of features from known previously analysed objects.

Although the above techniques can be used to efficiently extract features and descriptors, there are also other uses. For example, point cloud subsampling, where the above filtered point cloud is sampled. This can be used for point cloud compression and visualisation.

In a further embodiment, a system configured to analyse a point cloud is provided, the system comprising:
  a point cloud receiving unit adapted to receive a point cloud comprising a plurality of points, each point representing a spatial point in an image;
  a processor adapted to arrange the points into a hierarchical search tree, with a lowest level comprising a plurality of leaf nodes, where each leaf node corresponds to a point of the point cloud, the search tree comprising a plurality of hierarchical levels with tree nodes in each of the hierarchical levels, the nodes being vertically connected to each other though the hierarchy by branches, wherein at least one moment of the property of the descendant nodes is stored in each tree node, the processor being further adapted to determine and output geometric information of the points located within a region, by identifying the highest level tree nodes where all of the descendent leaf nodes are contained within the region and selecting the leaf nodes for the points where no sub-tree is entirely contained within the region, such that such that the points falling within the region are represented by the smallest number of nodes and performing statistical operations on the nodes representing the points in the region, the statistical measures being determined from the moments of the properties stored within the identified tree nodes.

In an embodiment the processor is a Graphics Processing Unit (GPU).

In a further embodiment, the method is implemented on a mobile device such as a mobile telephone, tablet etc. The method can be used to provide object recognition or registration for use with augmented reality applications, etc. The feature detection, description, filtering, point cloud subsampling, orientation determination embodiments and the other embodiments can all be implemented within a mobile device.

Since the embodiments of the present invention can be implemented by software, 25 embodiments of the present invention encompass computer code provided to a general purpose computer, mobile processing device etc., which may, in an embodiment comprise a GPU, on any suitable carrier medium. The carrier medium can comprise any storage medium such as a floppy disk, a CD ROM, a magnetic device or a programmable memory device, or any transient medium such as any signal e.g. an electrical, optical or microwave signal.

FIG. 1 shows a possible system which can be used to capture 3-D data in the form of a point cloud. The system basically comprises a camera 35, an analysis unit 21 and possibly a display (not shown).

In an embodiment, the camera 35 is a standard video camera and can be moved by a user. In operation, the camera 35 is freely moved around an object which is to be imaged. The camera may be simply handheld. However, in further embodiments, the camera is mounted on a tripod or other mechanical support device. A 3D point cloud may then be constructed using the 2D images collected at various camera poses. In other embodiments a 3D camera or other depth sensor may be used, for example a stereo camera comprising a plurality of fixed apart apertures or a camera which is capable of projecting a pattern onto said object, LIDAR sensors and time of flight sensors. Medical scanners such as CAT scanners and MRI scanners may be used to provide the data. Methods for generating a 3D point cloud from these types of cameras and scanners are known and will not be discussed further here.

The analysis unit 21 comprises a section for receiving camera data from camera 35. The analysis unit 21 comprises a processor 23 which executes a program 25. Analysis unit 21 further comprises storage 27. The storage 27 stores data which is used by program 25 to analyse the data received from the camera 35. The analysis unit 21 further comprises an input module 31 and an output module 33. The input module 31 is connected to camera 35. The input module 31 may simply receive data directly from the camera 35 or alternatively, the input module 31 may receive camera data from an external storage medium or a network.

In use, the analysis unit 21 receives camera data through input module 31. The program 25 executed on processor 23 analyses the camera data using data stored in the storage 27 to produce 3D data and recognise the objects and their poses. The data is output via the output module 35 which may be connected to a display (not shown) or other output device either local or networked.

FIG. 1 is purely schematic, the system could be provided within a mobile device such as a mobile telephone, tablet etc. where the camera is the inbuilt camera, for example the camera can be moved around to obtain 3D data. Alternatively, the data can be sent to the mobile device. In a further embodiment, the system can be provided in wearable technology such as watches and/or headwear, visors etc.

Figure 2:
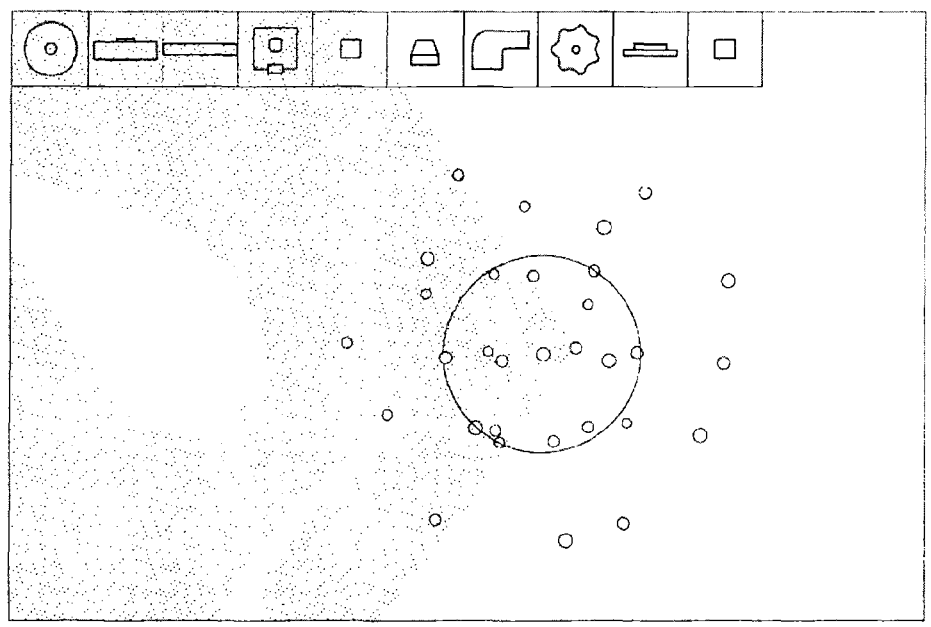
FIG. 2 is a representation of a feature.

The analysis unit can be configured to handle a number of tasks. The task of detecting features in an image will be described with reference to FIGS. 2 to 3. A feature is an area of interest of an object and usually where there is a change in the profile of the object. Detecting features is a crucial step in many 3D applications such as object recognition and registration, navigation and mapping, scene understanding and modelling. FIG. 2 shows a schematic of a corner of an object that has been identified as a feature.

Many feature detectors exist for 3D point clouds. Some of these detectors rely on extracting some statistics of points or surface normals located in vicinities of points observed in the scene.

In an embodiment, to identify suitable points for analysis, a query is provided as a ball region. To identify the points for analysis, a search tree structure is built to index the points. In the flow diagram of FIG. 2, the point cloud is received in step S101 from an apparatus of the type described with reference to FIG. 1.

In step S103, a search tree is built in order to index the points of the point cloud. Many different methodologies can be used for building the search tree, for example, Octree or KDTree. In some embodiments, a tree structure will be implemented, where at each node, the tree divides into two branches, selected so that there is the maximum distance between the values of the two groups produced at the node.

In this embodiment, in step S105, values are stored in the nodes of the search tree. The exact nature of the values will depend on the application and will be explained in more detail later. However, in each node, moments of a property associated with all points of the point cloud that descend from a tree node are stored within the tree node. For example, if the analysis to be performed requires the covariance of a property of the points, for example, the surface normal, colour etc, when the search tree is built, the covariance of the property calculated for all descendant nodes will be stored in the tree node. Each tree node will form the root node for its own sub-tree where the subtree comprises all descendant points.

In step S107, a query ball region R is set. In one embodiment, the size of the ball will be fixed. In other embodiments, the size of the ball will vary. In this particular example, for simplicity, a single ball size will be assumed.

Next, in an embodiment, a branch-and-bound method is used to search in the tree to end points located inside the ball. In this embodiment, the sub-trees which fall completely within the region R are identified such that the highest level sub trees are identified where all of the descendent leaf nodes are contained within the region.

Where it is not possible to identify a sub-tree because one is not entirely contained within the region, the leaf nodes representing the points will be selected. Thus, the points falling within the region are represented by the smallest number of nodes.

Figures 4A, 4B:
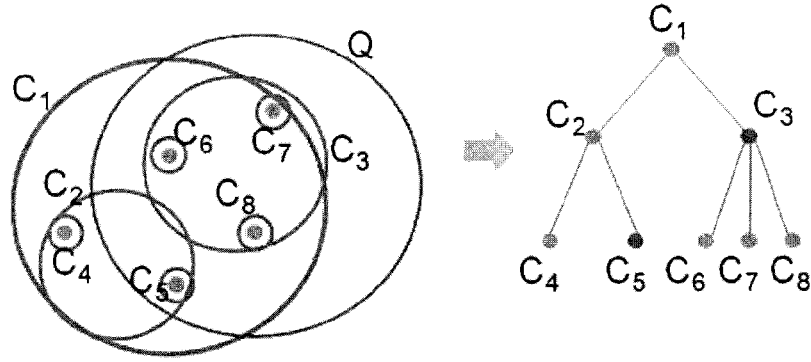
FIG. 4A is a diagram showing a query overlapping with tree nodes and leaf nodes.
FIG. 4B is a schematic of a search tree.

The determining of nodes in the region R is performed in step S109. This will be explained in more detail with reference to FIGS. 4A and 4B. In FIG. 4B a search tree is shown with a root node C1 at the highest level which splits into two branches. Each of the two branches will terminate in a tree node C2 and C3 respectively. Tree node C2 subdivides further and has descendant leaf nodes C4 and C5. Tree node C3 subdivides further to terminate in three leaf nodes C6, C7 and C8.

FIG. 4A shows a schematic of the search query Q with the leaf nodes and tree nodes C1 to C8 marked. It can be seen that the entire tree from root node C1 is not entirely contained within search query Q, as point C4 lies outside Q. However, the subtree from tree node C3 is entirely contained within search query Q and therefore, the tree node C3 can be used to represent the three descendant nodes C6, C7 and C8.

Leaf node C5 does not belong to a sub-tree that is entirely contained within the search query Q and hence this point can only be represented by the leaf node C5.

As explained above the tree nodes store moments for their descendent leaf nodes.

Figure 3:
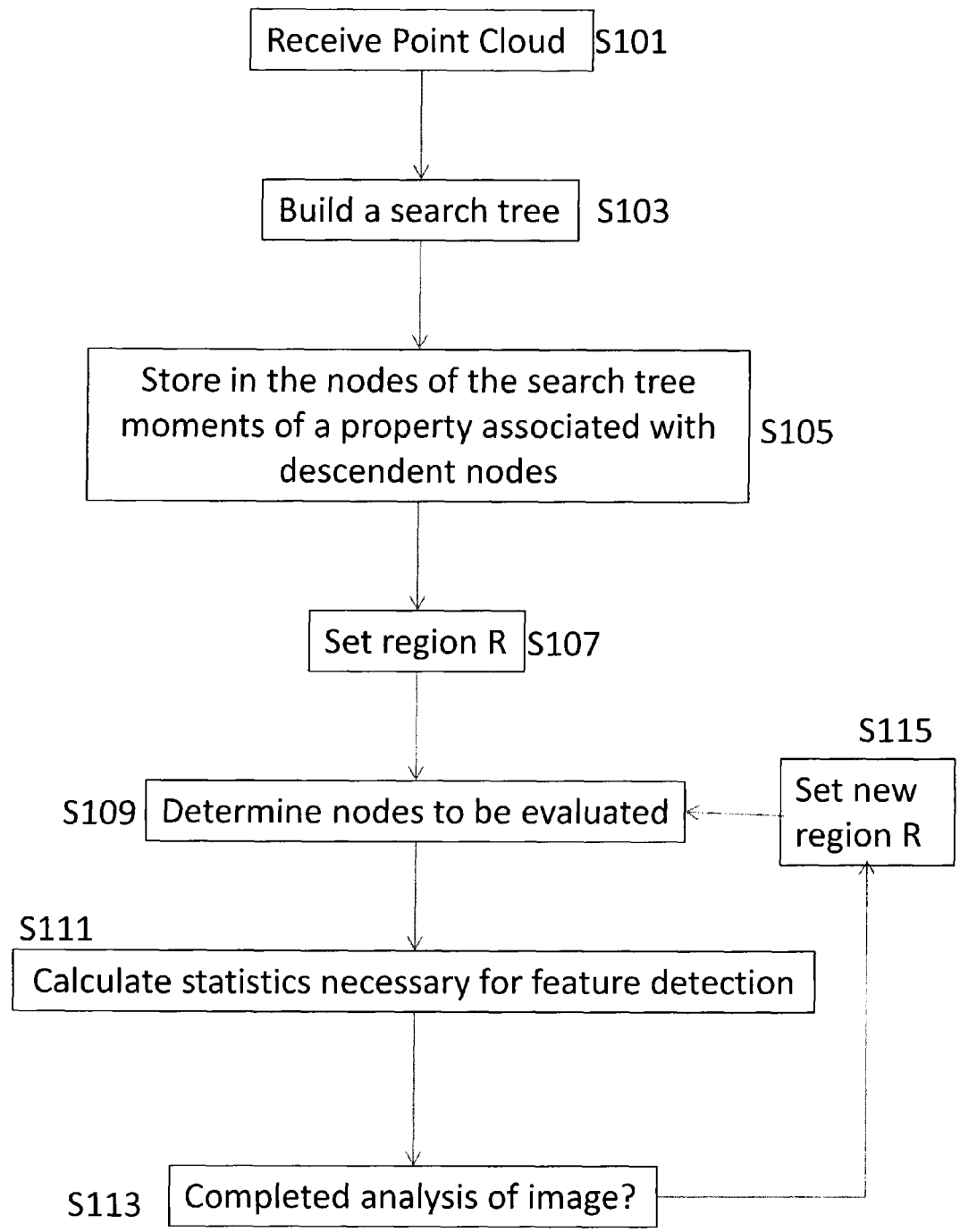
FIG. 3 is a flow diagram illustrating a method of feature detection in accordance with an embodiment.

The embodiment of FIG. 3 relates to a keypoint detector. The Harris method is a corner and edge based method and these types of methods are characterized by their high-intensity changes in the horizontal and vertical directions. When adapted to 3D, image gradients are replaced by surface normals. A covariance matrix C(x) is computed from the surface normals of points located in a ball region centred at each point $x \in \mathbb{R}$ of the point cloud, with a predefined radius r. The keypoint response is then defined by:

$$R(x) = |C(x)| - k(\text{trace}(C(x))^2, \quad (1)$$

where k is a positive real-valued parameter. This parameter serves roughly as a lower bound for the ratio between the magnitude of the weaker edge and that of the stronger edge. In addition, there are two other variants of the Harris 3D keypoint detector. The Lowe method uses the following response:

$$R(x) = \frac{|C(x)|}{(\text{trace}(C(x))^2}. \quad (2)$$

The Noble method uses the following response:

$$R(x) = \frac{|C(x)|}{(\text{trace}(C(x))}. \quad (3)$$

In the Kanade-Lucas-Tomasi (KLT) detector, to adapt to 3D, the covariance matrix is calculated directly from the input 3D positions instead of the surface normals. For the keypoint response, the first eigenvalue of the covariance matrix is used.

The so-called SIFT keypoint detector uses a 3D version of the Hessian to select keypoints. A density function $f(x)$ is approximated by sampling the data regularly in space. A scale space is built over the density function, and a search is made for local maxima of the Hessian determinant. The input point cloud is convolved with a number of Gaussian filters with increasing scales. The adjacent smoothed volumes are then subtracted to yield a few Difference-of-Gaussian (DoG) clouds. Keypoints are identified as local minima/maxima of the DoG clouds across scales.

Intrinsic Shape Signatures (ISS) relies on region-wise quality measurements. This method uses the magnitude of the smallest Eigen-value (to include only points located inside a query ball with large variations along each principal direction) and the ratio between two successive eigenvalues (to exclude points having similar spread along principal directions). Like the above methods, it requires an algorithm to search for points located inside a given ball region.

The above are examples of keypoint or feature detection methods. Each of them require the calculation of the covariance matrix for the points that fall within the region R. In step S109, the nodes that fall within the region R were identified.

First, consider an algorithm that finds points located inside a given query ball region as a radius search, which takes as input a 3D point p and radius r>0, and returns as an output a list of points of the point cloud, $\chi = \{x_1, \ldots, x_n\}$ where n is the number of points returned.

In the method discussed in relation to step S109, each node of the underlying tree defines a subset of the point cloud, which is the set of all points of leaf nodes which are descendants of the given node.

Let $c_1, \ldots, c_n$, represent the tree nodes (for some m<n) and denote by P(c) the set of points of leaf nodes of a node c. The subset $\chi$ can be equivalently represented as a union of $P(c_{i_1}) \cup \ldots \cup P(c_{i_k})$ for some set of tree nodes $C = \{c_{i_1}, \ldots c_{i_k}\}$. Since in practice the number of elements in C, i.e. k, is substantially smaller than the number of elements in $\chi$, i.e. n, if the radius search algorithm returns C instead of $\chi$ and if the statistics based on C are computed instead of $\chi$, efficiency will be improved.

It is possible to compute the statistics based on C, but a further step is needed. For ease of explanation, it will be assumed that the goal is to compute the statistics of points, i.e. $\chi$. Once this example is explained, the extension of the idea to other kinds of geometric information, for example surface normals will be explained.

The number of points, the mean of points, and the covariance matrix of points of $\chi$ will be denoted by n, u and C, respectively. Defining the following quantities, $$m(\chi) = \sum_{i=1}^{n} x_i, \quad (4)$$

$$M(\chi) = \sum_{i=1}^{n} x_i x_i^T, \quad (5)$$

the mean and the covariance can be computed indirectly via the following formulae:

$$u = m(\chi)/n, \quad (6)$$

$$C = M(\chi)/n - m(\chi)m(\chi)^T/n^2. \quad (7)$$

Hence, all that is left is to compute $m(\chi)$ and $M(\chi)$ from C. Since these two quantities are sums of some quantities of the points, and sum is an associative operator, they can be computed by the following formulae:

$$m(\chi) = \sum_{j=1}^{k} m(P(c_{i_j})), \quad (8)$$

$$M(\chi) = \sum_{j=1}^{k} M(P(c_{i_j})). \quad (9)$$

Therefore, if the quantities m(P(c)) and M(P)(c)) are computed for every tree node c, we can compute the point statistics of $\chi$ from C for every query via summing these quantities.

The following can be implemented by the following algorithm

Algorithm 1 Fast Statistics Extraction

1: Offline phase: for each tree node c, pre-compute a bounding ball B(c), and quantities m(P(c)) and M(P(c)).
2: Online phase: input is a query ball Q = (p, r).
3: Create an empty stack of tree nodes H and push the root node $c_0$ to H.
4: Set n = 0, m = 0 and M = 0.
5: while H is not empty do
6:    Pop c from H.
7:    if B(c) ⊂ Q then
8:       Set n = n + |P(c)|.
9:       Set m = m + m(P(c)).
10:      Set M = M + M(P(c)).
11:    else if B(c) ∩ Q ≠ ∅ then
12:      Push every child node of c to H.
13:    end if
14: end while
15: return n as the number of points, m/n as the mean of points, and M/n mm$^T$/n$^2$ as the covariance of points.

It should be noted that since each search query does not modify the tree structure, multiple queries can be served in parallel. This allows tasks to be further accelerated, by loading the tasks to a GPU.

The above example has used the statistics of the points to be stored in the tree nodes. However, as noted above any geometric property of the points could be used in the same way and the required moments of this property stored in the nodes in order to reduce the computation as explained above. For example, the $0^{th}$ order moments may be calculated (i,e, the numbers of points) may be stored in the tree nodes, the $1^{st}$ order moments of any property, for example, to calculate the mean values. In a further embodiment $2^{nd}$ order moments can be stored in order to calculate the covariance etc. Further order moments may also be calculated and pre-stored in the tree nodes.

The flow chart of FIG. 3 relates to feature detection and in step S111, the statistics necessary for feature detection are calculated. The exact statistics used depend on the actual method used, possible examples have been given above. If, for example, the ISS method is used, the covariance matrix is constructed. This is achieved by pre-computing the second moment of the position of the points or the surface normals for the tree nodes as described above.

Once this has been done, for one region, the method progresses to step S113 where it is determined whether or not the whole image has been analysed. If there are more regions, a new region R is set and the procedure is completed again from where the nodes to be evaluated are determined. In an embodiment, each region is defined as a ball centered at a point of the point cloud/image with a given radius. It is determined that the whole image has been analysed when every point and every radius has been analysed.

In some embodiments, the size of the region is fixed. In other embodiments, the radius of the region R is optimised. Here, the process from step S109 will be repeated for regions centred about the same point but with different radii. In an embodiment, this is achieved by computing a score, for example, the "cornerness" of points in a region, determined by the $3^{rd}$ eigenvalue of the covariance matrix of points located in that region. In feature detection, regions are selected that score higher than all their neighbouring regions.

In practice, two ball regions are considered neighbours to each other if both following conditions are met:
the ratio between the two radii is between 1/alpha and alpha, where alpha is often set to 1.5.

The distance between two ball centers is less than beta times the radius of the larger ball, where beta is often set to 0.8.

This applies to both the cases in when the same radius is fixed for every ball region and the case in which the radius is varied for each ball region. In both cases, a ball region is only retained if its score is higher than the scores of all of its neighbouring ball regions. Note that in the case that the radius is varied, in an embodiment the radius per point is not optimized. Instead, all ball regions at different radii and different points are computed. Then the ball regions with highest scores compared to their neighbours are retained.

The above method was tested both using a CPU and a GPU using the OpenGL Shading Language (GLSL). Ten input point clouds for testing were taken from the Toshiba Object Recognition dataset each representing a different object. The number of points per point cloud ranged from 80000 to 150000.

Figure 5:
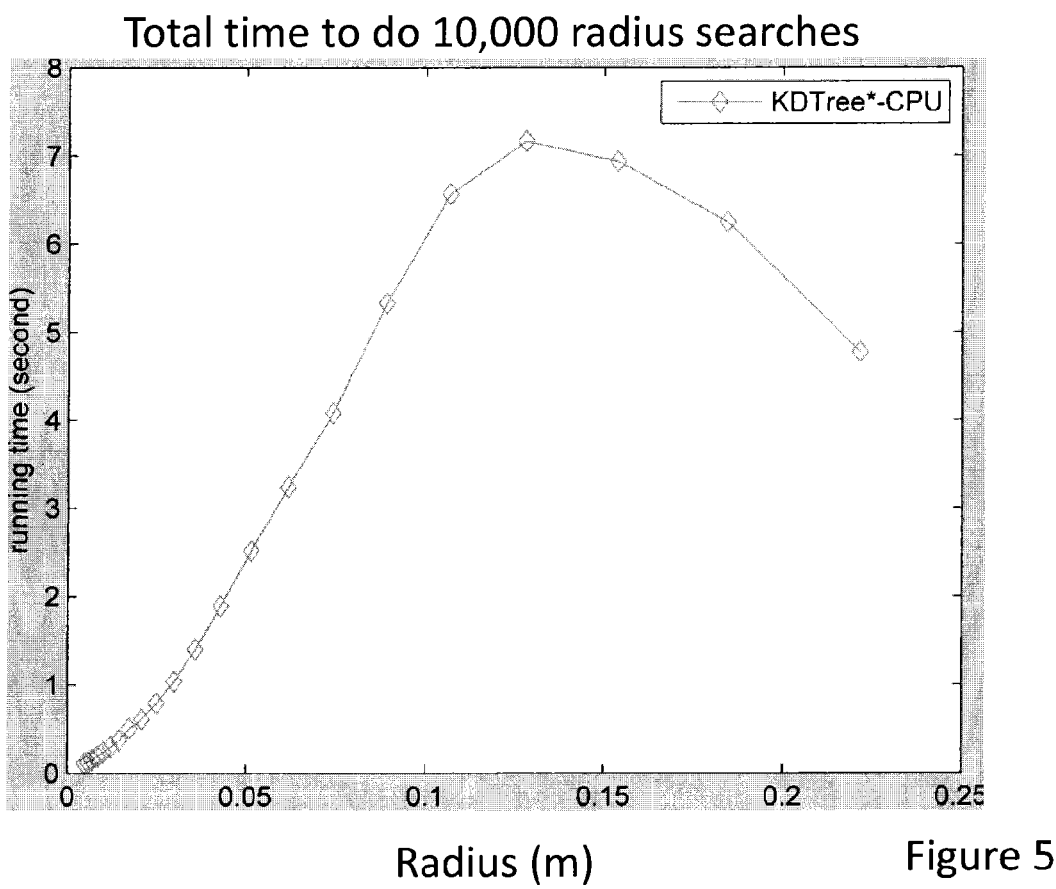
FIG. 5 is a plot of the time taken to perform 10,000 radius searches against the radius of the search region.

Query balls were generated at random with centres being uniformly sampled from the point cloud's points and radius varying from 0 to 25 cm. The above method requires a low processing time. Illustrated in FIG. 5 is the plot of the average processing time over the query ball's radius, obtained from the above method. Interestingly, as the radius increases, the speed of the above method started to decrease because the number of tree nodes actually decreases.

At the extremum, when the radius is so large that every point is included in a query ball, the above method visits only a single tree node, i.e. the root node.

Figure 6:
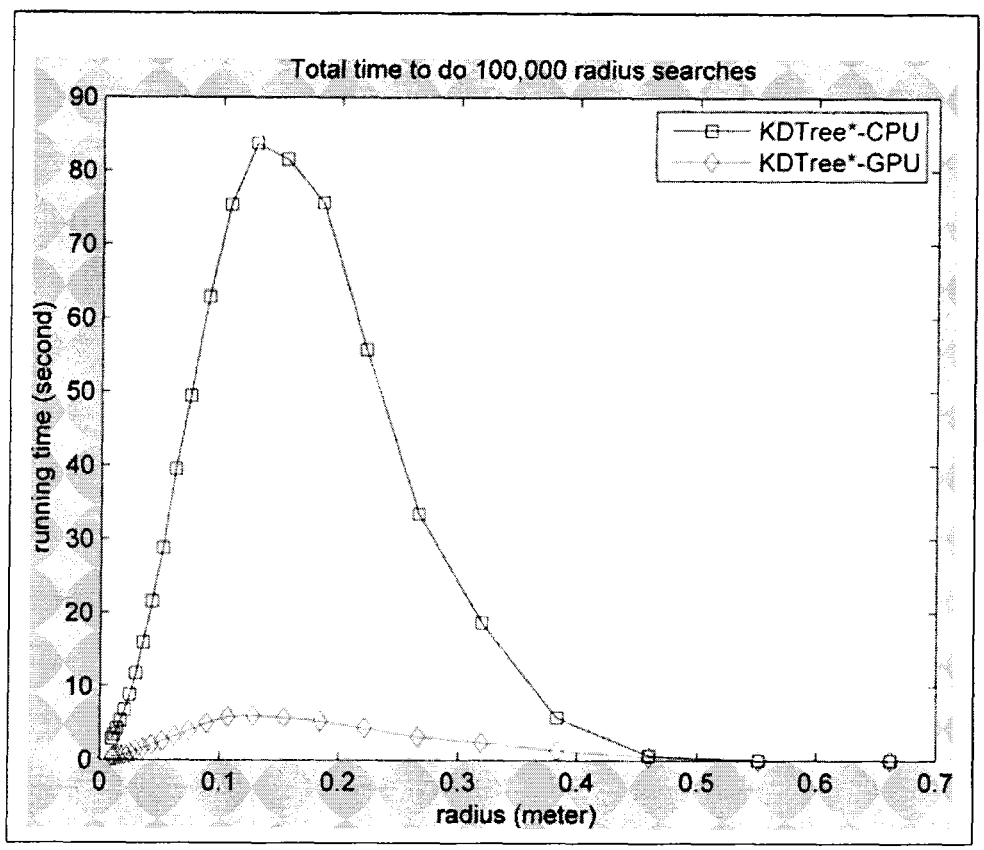
FIG. 6 is a plot of the time taken to perform 100,000 radius searches against the radius of the search region using a method in accordance with the present invention running on both a CPU and GPU.

Comparing the CPU version with the GPU version of the above method, illustrated in FIG. 6, it is shown that the GPU version improves the speed by 8-13 folds.

It can be seen from the above example, that it provides a method for fast extraction of statistics feature detection. The method improves the efficiency of feature detection, which is very useful for large-scale data.

In the above method, the search tree is built and points within a given ball region are located. However, in the above method for each tree node, all points that locate at the descendant leave nodes of the tree node are additionally identified. Next, a bounding ball and a set of moments from these points for each tree node is pre-computed. When extracting geometric information from a given query ball region, the bounding balls are used to quickly identify a minimal set of tree nodes such that their points are the same set of points located inside the query ball region. Geometric information is then extracted indirectly from the moments of the identified tree nodes, rather than from the set of points inside the query ball region.

The speed of processing the above method is not dependent on the number of points found per query, but dependent on the number of tree nodes found. However, the number of tree nodes is practically much smaller than the number of points, leading to a substantial gain in efficiency.

The larger the point cloud, the more gain in speed is seen with the above method. For example, when a query ball region is so large that it covers every point of the point cloud, the above method returns a single tree node as opposed to every point in the query ball region. The gain in this case can be N times where N is the number of points of the point cloud.

The above description has related to feature detection, but the method can also be applied to the construction of feature descriptors.

Figure 7:
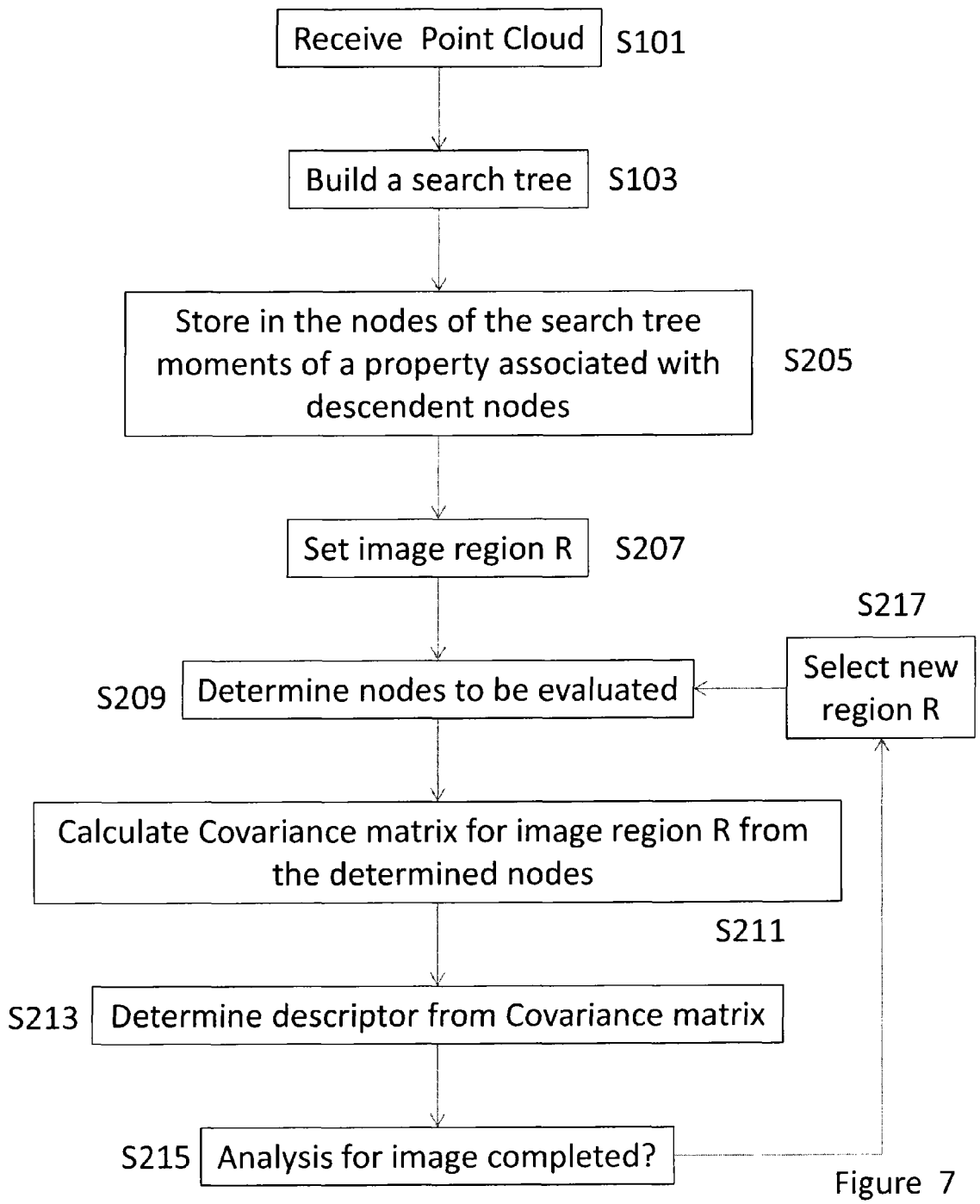
FIG. 7 is a flow diagram illustrating a method of generating a feature descriptor in accordance with an embodiment.

FIG. 7 is a flow diagram illustrating a method of generating a feature descriptor and/or extracting a feature in accordance with an embodiment. To avoid any unnecessary repetition, like reference numerals will be used to denote like features.

As for the flow diagram explained with reference to FIG. 3, a point cloud is obtained in step S101. In step S103, a search tree is built in order to index the points of the point cloud.

In step S205, the moments of a property are stored in each node, the moment is calculated based on all nodes descending from the node where the moment of the property is stored. The process is explained in more detail with reference to step S105 of FIG. 3. In this embodiment, for determining a feature descriptor, the zeroth order, first order and second order moments of the positions are stored in the nodes.

In step S207, a region R of the image is set to be analysed. When constructing a descriptor, this may be a set size around a point x.

In step S209 the nodes to be evaluated are determined. This process is the same as that described with reference to step S109 of FIG. 3.

In an embodiment, the descriptor may be determined by calculating the covariance matrix in step S211 using the moments stored in the nodes as explained with reference to step S205. The descriptor is determined in step S213.

In step S215, a check is performed to see if the analysis has been completed. If it has not been completed, then a new region is selected in step S217 and the nodes within this region are evaluated in step S209 to repeat the process.

For example, if the position of the features has already been extracted as points x, then the process can go through the points x in sequence.

Figure 8:
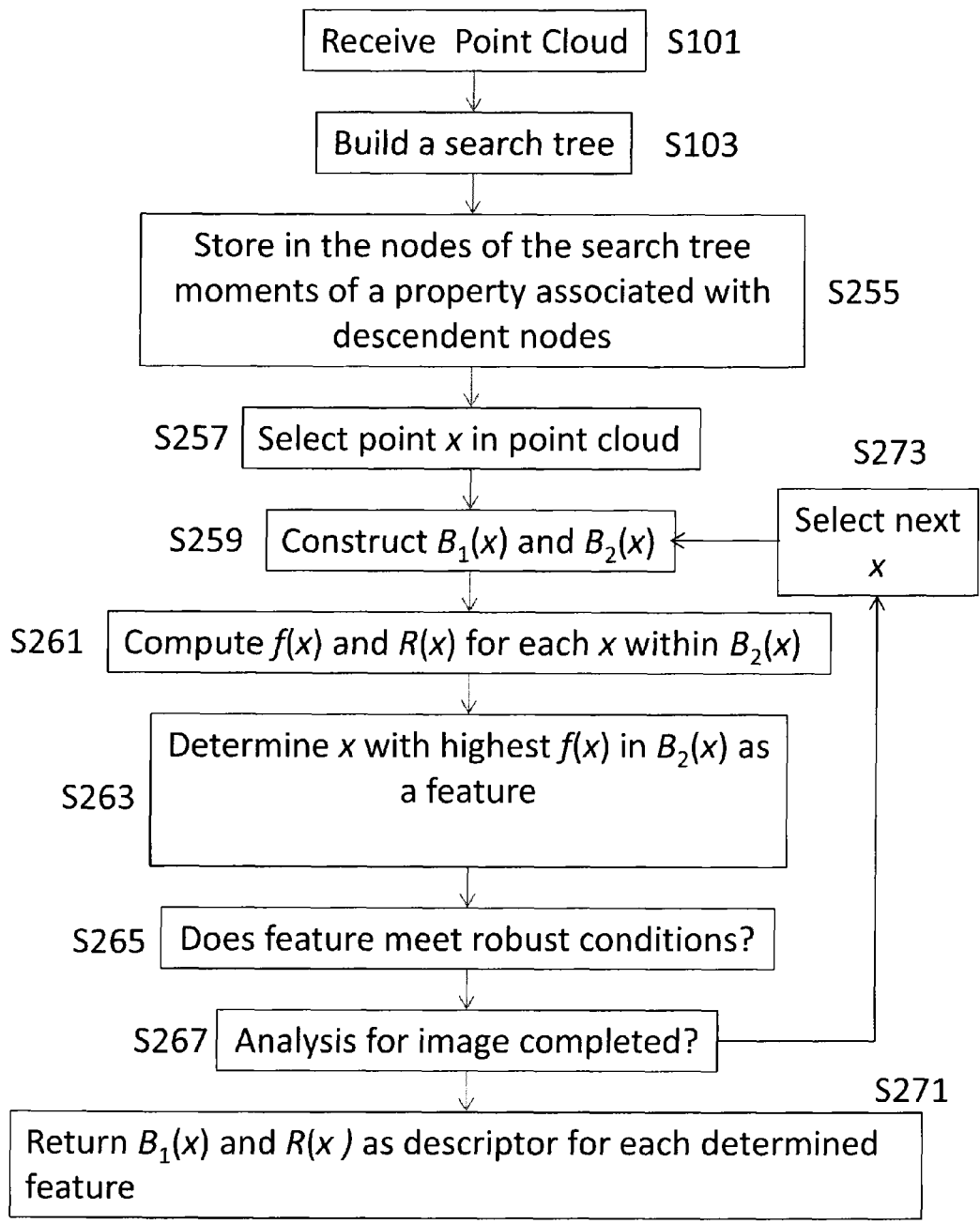
FIG. 8 is a flow diagram illustrating a method of extracting a feature and generating a feature descriptor in accordance with an embodiment.

FIG. 8 is a flow diagram of a method for both feature extraction and detection. To avoid any unnecessary repetition, like reference numerals will be used to denote like features.

As for the flow diagram explained with reference to FIG. 3, a point cloud is obtained in step S101. In step S103, a search tree is built in order to index the points of the point cloud.

In step S255, the moments of a property are stored in each node, the moment is calculated based on all nodes descending from the node where the moment of the property is stored. The process is explained in more detail with reference to step S105 of FIG. 3. In this embodiment, for feature extraction and generation of descriptors, the zeroth order moment, first order moments and second order moments of the positions are stored.

In step S257, a point x is selected from the point cloud. Eventually, the method will be performed for all points in the point cloud.

In step S259, for point x a first ball $B_1(x)$ centered at x with a fixed radius $r_1$ and a ball $B_2(x)$ also centered at x but with a fixed radius $r_2$ are constructed. In step S261, for each ball $B_1(x)$, a 3D orientation $R(x)$ and a score $f(x)$ is computed.

In an embodiment, this feature extraction method is used to recognize objects of relatively the same size, i.e. their appearance can be bounded by a 3D ball of a known radius $r_0$. Here $r_1$ is determined to be gamma times $r_0$ where gamma is often set to 0.3 and $r_2$ is determined to be beta times $r_1$ where beta is often set to 0.8. The values for gamma and beta can be varied as necessary.

The 3D orientation $R(x)$ and the score $f(x)$ for a given point x are computed by computing the number of points $n(x)$ located inside $B_1(x)$, the mean $m(x)$ and the covariance matrix $C(x)$ of the positions of all points located inside $B_1(x)$. The number of points can be determined from the stored zeroth order moments.

The three eigenvalues $v_1(x)$, $v_2(x)$ and $v_3(x)$ of the covariance matrix $C(x)$ are calculated and sorted into descending order, together with their associated eigenvectors $e_1(x)$, $e_2(x)$, and $e_3(x)$. For each eigenvector $e_i(x)$ where $i=1 \ldots 3$, its direction is flipped by setting $e_i(x)=-e_i(x)$ if the dot product of $e_i(x)$ and $m(x)-x$ is negative. The three eigenvectors are then assigned as the 3D orientation: $R(x)=(e_1(x), e_2(x), e_3(x))$.

Next, the third eigenvalue $v_3(x)$ is assigned as the score $f(x)$. Intuitively, the score $f(x)$ represents how thick the surface of points in $B_1(x)$ is. Features detected by the method often correspond to corners, edges, and intersected regions of two or more objects.

In step S263, the point x is selected whose score $f(x)$ is greater than the scores of all neighbouring points located inside $B_2(x)$. In step S265, it is checked if the selected feature is robust. In an embodiment, the features that do not meet the following requirements are removed:

$n(x)<\theta_1$: (default value for $\theta_1$ is 5) the number of points in $B_1(x)$ is too few.

$v_2(x)/v_1(x)<\theta_2$: (default value for $\theta_2$ is 0.95) $v_2(x)$ is too close to $v_1(x)$ making the computation of $e_1(x)$ and $e_2(x)$ unstable.

$v_3(x)/v_2(x)<\theta_3$: (default value for $\theta_3$ is 0.95) $v_3(x)$ is too close to $v_2(x)$ making the computation of $e_2(x)$ and $e_3(x)$ unstable.

In step S267, a check will be performed to see if all points in the point cloud have been analysed. If not, then a new point x is selected in step S273 and the process loops back to step S259.

The method of the above embodiment requires a very low processing time. It currently runs at 15 frames per second, suitable for real-time applications. Another advantage is that it does not require colour information. Hence, it is suitable for situations where colour is not a distinctive feature, e.g. for texture-less objects or objects captured in poor light conditions.

Figure 9:
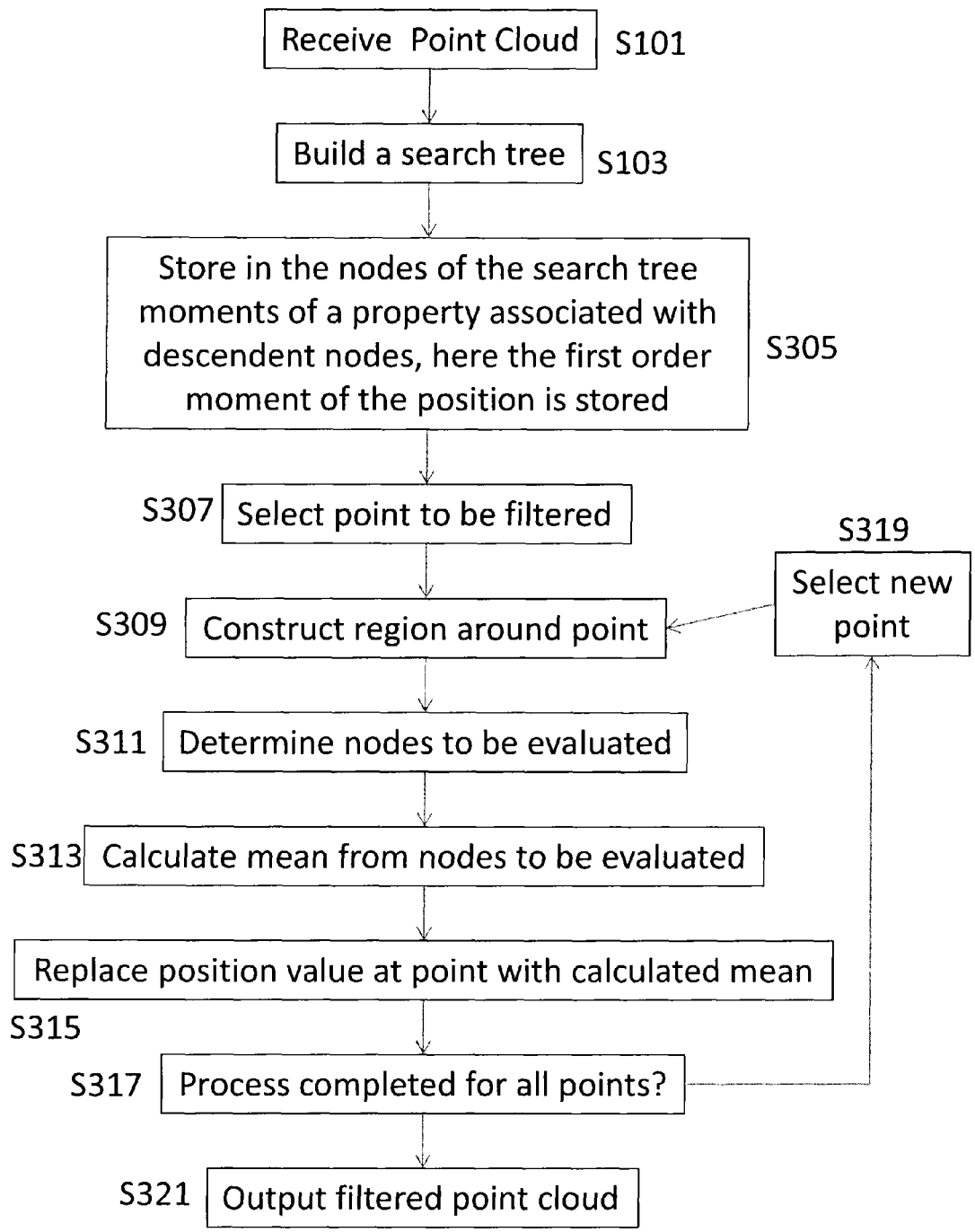
FIG. 9 is a flow diagram illustrating a method of point cloud filtering in accordance with an embodiment.

FIG. 9 is a flow diagram illustrating a method of point cloud filtering in accordance with an embodiment. To avoid any unnecessary repetition, like reference numerals will be used to denote like features.

As for the flow diagram explained with reference to FIG. 3, a point cloud is obtained in step S101. In step S103, a search tree is built in order to index the points of the point cloud.

In step S305, the moments of a property are stored in each node, the moment is calculated based on all nodes descending from the node where the moment of the property is stored. The process is explained in more detail with reference to step S105 of FIG. 3. In this embodiment, for filtering, the first order moment is stored in the nodes such that the mean of the position of the descendant nodes is stored.

In this filtering embodiment, each point is selected and the position of the point is replaced with the mean of the region around the point. In step S307 the point to be filtered is selected. Each point in the point cloud to be analysed will be filtered during the process. Therefore, in this embodiment, the points to be filtered are selected in sequence.

A region round the point is set in step S309 which is a ball centred around the point. In this embodiment, the ball will have a fixed radius. The radius will be set dependent on the level of filtering required. The radius will be fixed for the whole point cloud that is to be imaged. In an embodiment, the radius is determined as follows. First, the shortest non-zero distance between any two points of the point cloud is established by exhaustively going through every pair of points. Let this shortest distance be $d_0$. Then, the radius is set to be lambda times $d_0$ where lambda is often set to 5.

In step S311 the nodes to be evaluated are determined. This process is the same as that described with reference to step S109 of FIG. 3. The mean is calculated in step S313 using the first order moments stored in the nodes as explained with reference to step S305. The position value at each point is replaced with the calculated mean in step S315. In step S317, a check is made to see if the process has been completed for all points. If not, a new point is selected in step S319 and a region is constructed around that point in step S309. The process then repeats until it has been completed for all points.

In the above example, the property is the position of the points. However, other properties could be treated in the same way. For example, the colour of the points could be filtered as described above with the first order moment of the colour being stored as the property. It should be noted, that the moments of multiple properties may be stored in the nodes so that the means, or other statistical measure of multiple properties may be calculated.

Other methods of filtering may also be used, for example, the mean may be calculated as described with reference to figure B up to step S313. However, then at step S315, the difference between the property at the point from the mean may be calculated. If the difference is greater than a pre-determined value, the point may be discarded or replaced by the mean value.

Figure 10:
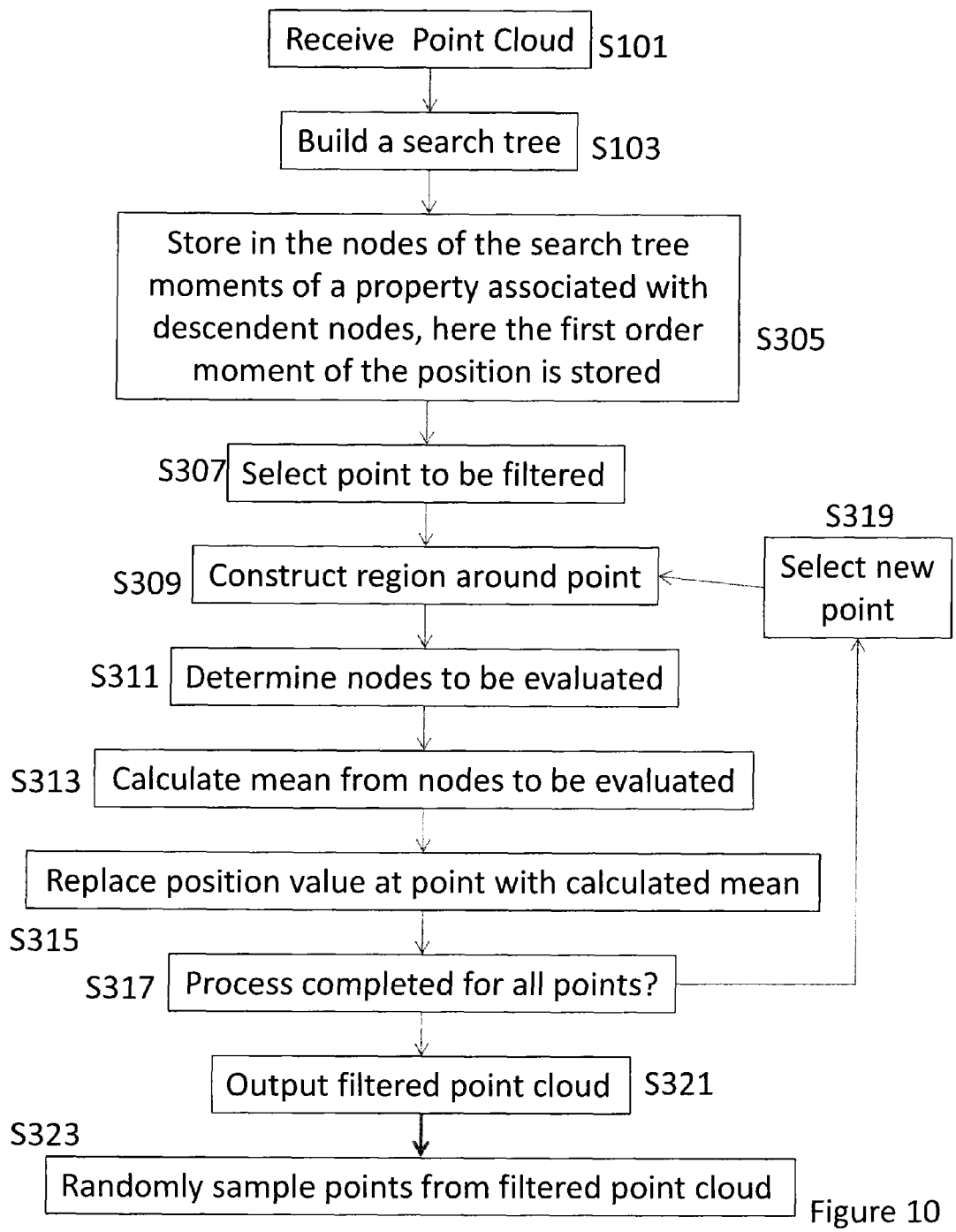
FIG. 10 is a flow diagram illustrating a method of point cloud sub-sampling in accordance with an embodiment.

FIG. 10 is a flow diagram illustrating a method of point cloud sub-sampling. The method is based on the filtering method described with reference to FIG. 9. To avoid any unnecessary repetition, like reference numerals will be used to denote like features. After the filtered point cloud has been generated in step S321, points are randomly sampled from the filtered point cloud to produce a sub-sampled point cloud.

The above method described with reference to FIG. 10 is also a method of point cloud compression as the subsampled point cloud has a lower number of points than the point cloud received in step S101.

Although the above examples have referred to random sampling of the points, other sampling methods could be used. Also, the method of filtering described with reference to figure B could be modified, by, for example, only replacing the value of the point with the mean if the point is over a predetermined distance from the mean or points that a more than a predetermined distance from the mean can be discarded.

Figure 11:
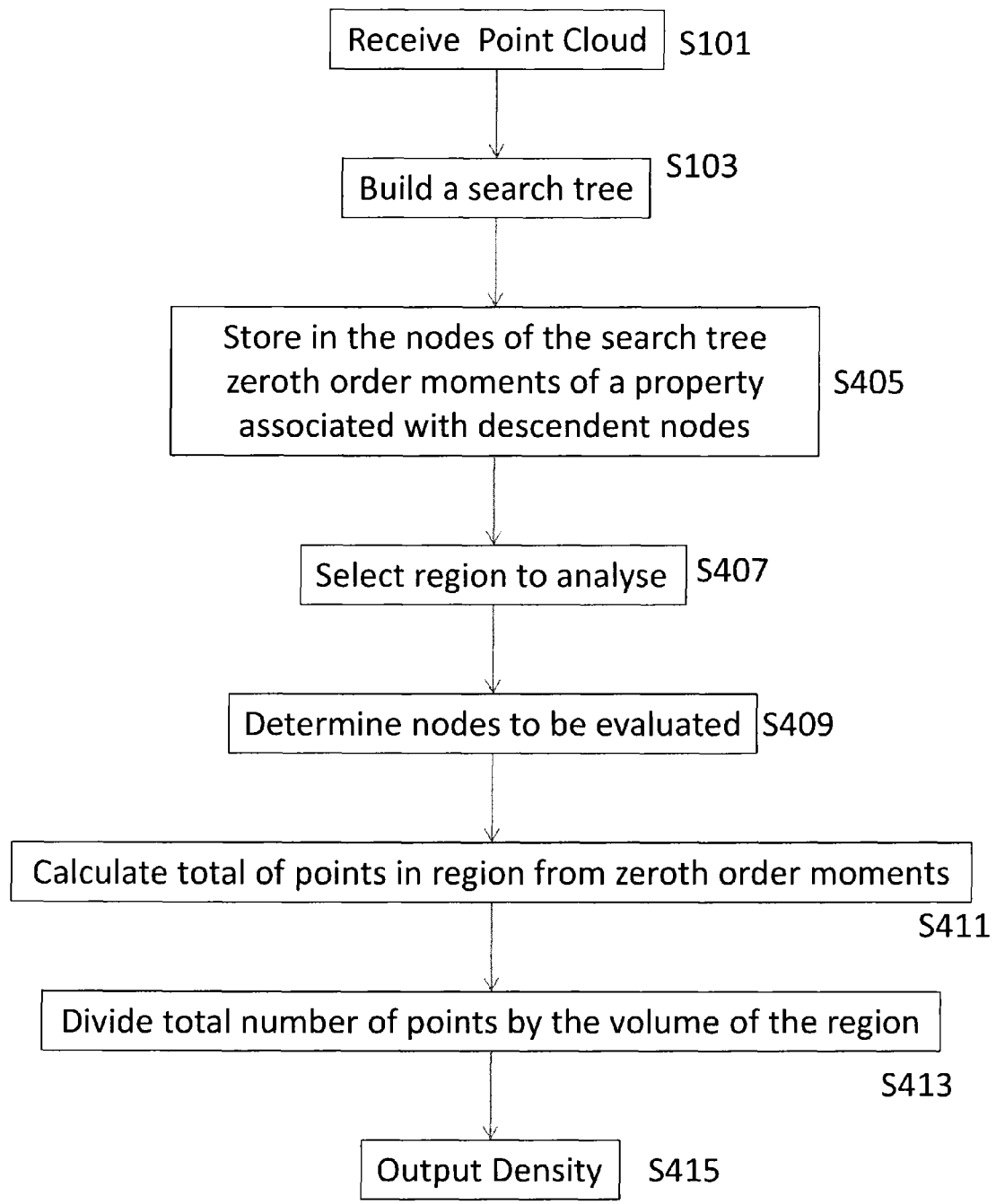
FIG. 11 is a flow diagram illustrating density estimation of a point cloud in accordance with an embodiment.

FIG. 11 is a flow diagram illustrating density estimation of a point cloud. To avoid any unnecessary repetition, like reference numerals will be used to denote like features.

As for the flow diagram explained with reference to FIG. 3, a point cloud is obtained in step S101. In step S103, a search tree is built in order to index the points of the point cloud.

In step S405, the moments of a property are stored in each node, the moment is calculated based on all nodes descending from the node where the moment of the property is stored. The process is explained in more detail with reference to step S105 of FIG. 3. In this embodiment, for density estimation, the first order moment is stored in the nodes thus, the number of descendant nodes is stored in each node.

In step S407, the region for which the density is to be estimated is selected. In step S409, the nodes to be evaluated are determined in the same manner as described with reference to step S109 of FIG. 3. The total number of points in the region is then calculated using the zeroth order moments stored in the nodes in step S411. To estimate the density, the number of points is then divided by the volume of the region in step S413 and the density is output in step S415.

Figure 12:
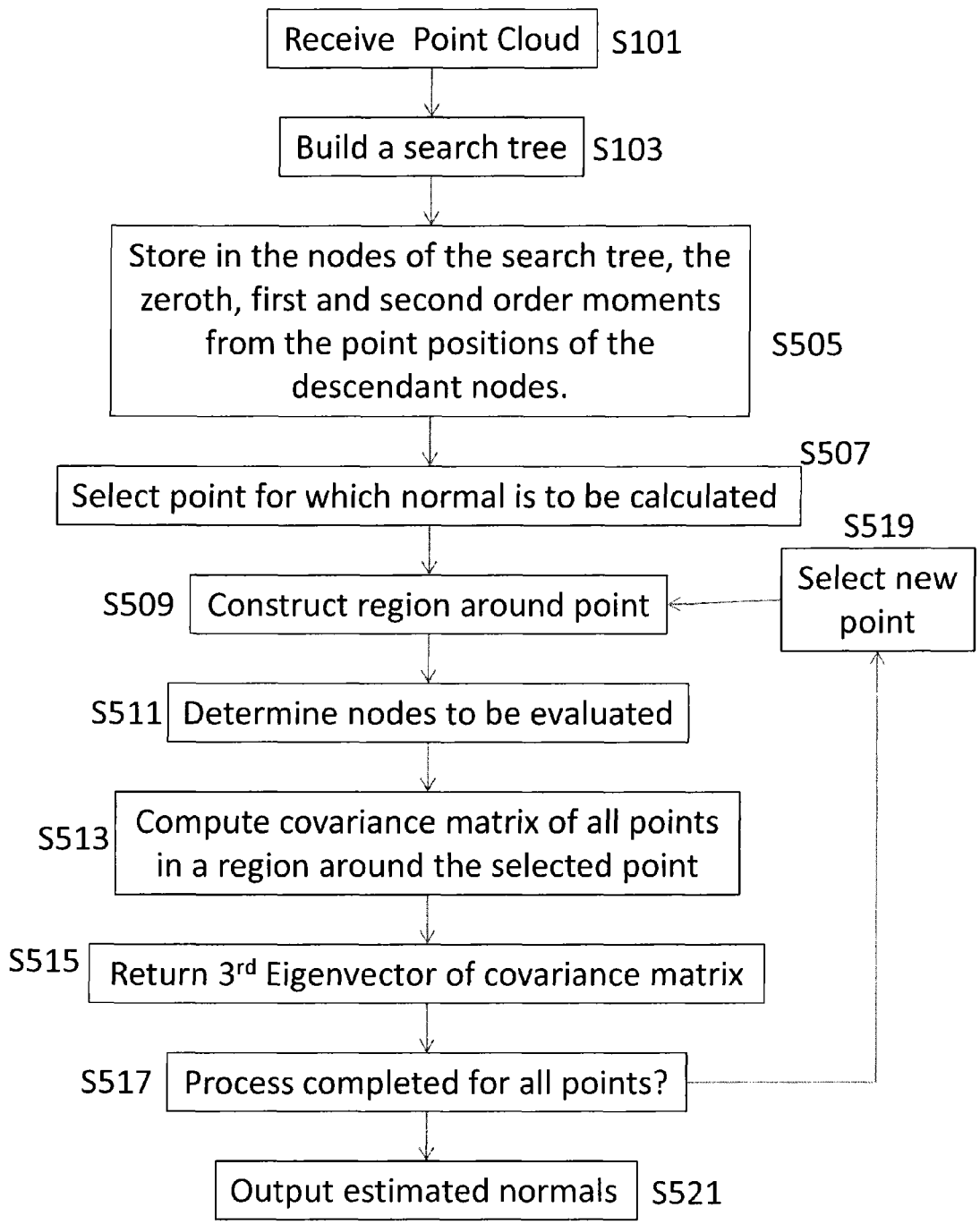
FIG. 12 is a flow diagram illustrating a method of estimating the normals from a point cloud in accordance with an embodiment.

FIG. 12 is a flow diagram illustrating a method of estimating the normals from a point cloud. To avoid any unnecessary repetition, like reference numerals will be used to denote like features.

As for the flow diagram explained with reference to FIG. 3, a point cloud is obtained in step S101. In step S103, a search tree is built in order to index the points of the point cloud.

In step S505, the moments of a property are stored in each node, the moment is calculated based on all nodes descending from the node where the moment of the property is stored. The process is explained in more detail with reference to step S105 of FIG. 3. In this embodiment, for normal estimation, the zeroth, first and second order moments from the point positions of the descendant nodes are stored in each tree node.

In step S507, the point for which the normal is to be calculated is selected. In step S509, a region is constructed around the point. In an embodiment this is a ball region with a fixed radius. In an embodiment, the radius is determined as follows. First, the shortest non-zero distance between any two points of the point cloud is established by exhaustively going through every pair of points. Let this shortest distance be $d_0$. Then, the radius is set to be lambda times $d_0$ where lambda is often set to 5.

In step S511, the nodes to be evaluated are determined in the same manner as described with reference to step S109 of FIG. 3. In step S513, the covariance matrix of all points within the region is computed using the stored, zeroth, first and second order moments. In step S515, the normal is then estimated as the third Eigen vector of the covariance matrix.

In step S517, a check is performed to see if the process has been performed for all points. If not, and there are more points for which an estimate of the normal is required, a new point is selected in step S519 and the process loops back to step S509 where a new region is constructed. In step S521, the estimated normals are outputted.

In a further embodiment, a mean of the normal vectors is computed by storing the zeroth and first order moments of the normals in the tree nodes.

Figure 13:
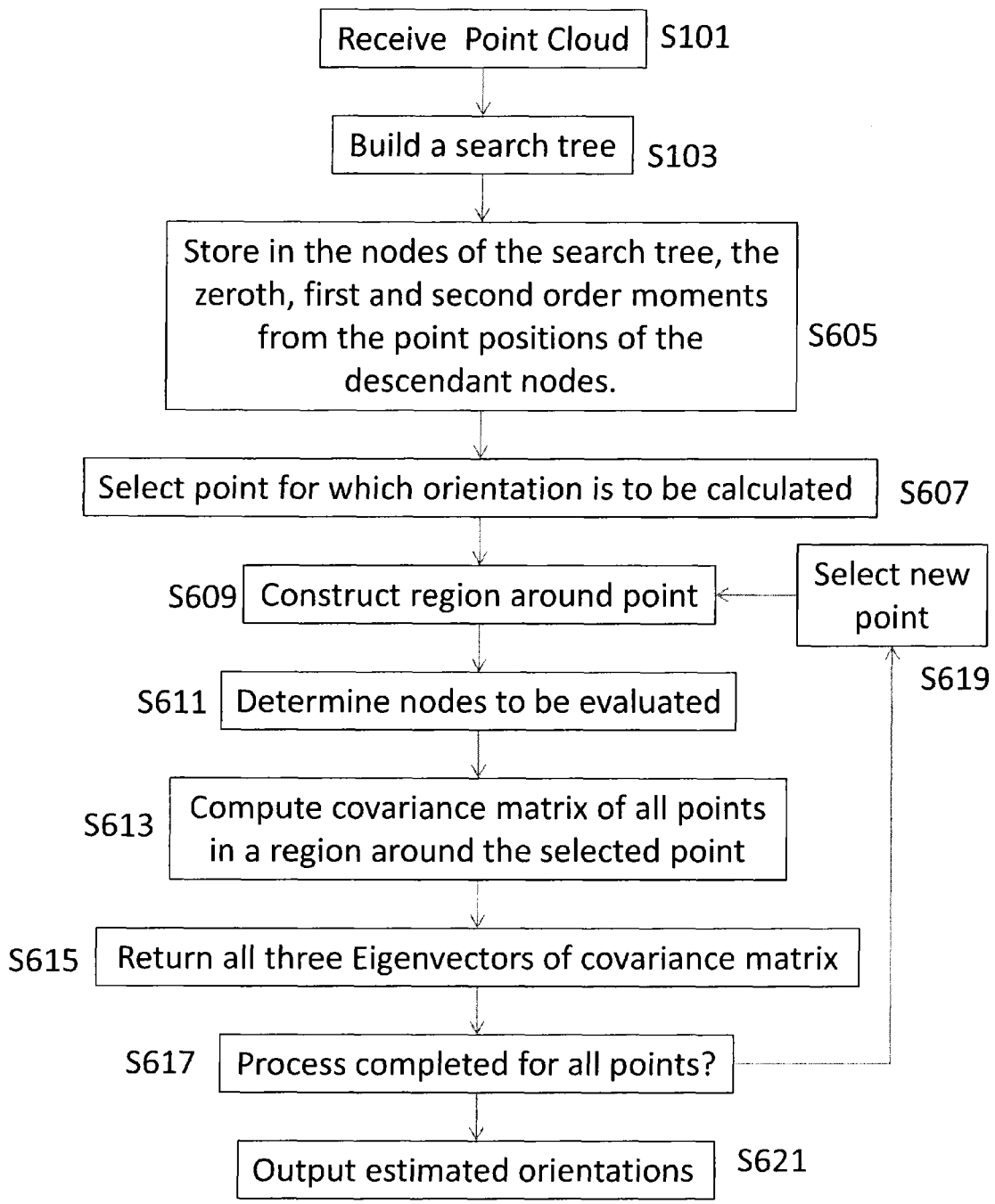
FIG. 13 is a flow diagram illustrating a method of estimating the orientation of a surface of a point cloud in accordance with an embodiment.

FIG. 13 is a flow diagram illustrating a method of estimating the orientation of a surface of a point cloud. To avoid any unnecessary repetition, like reference numerals will be used to denote like features.

As for the flow diagram explained with reference to FIG. 3, a point cloud is obtained in step S101. In step S103, a search tree is built in order to index the points of the point cloud.

In step S605, the moments of a property are stored in each node, the moment is calculated based on all nodes descending from the node where the moment of the property is stored. The process is explained in more detail with reference to step S105 of FIG. 3. In this embodiment, for orientation estimation, the zeroth, first and second order moments from the point positions of the descendant nodes are stored in each tree node.

In step S607, the point for which the orientation is to be calculated is selected. In step S609, a region is constructed around the point. In an embodiment this is a ball region with a fixed radius. In an embodiment, when the orientation at each point in required, the radius may be determined as follows. First, the shortest non-zero distance between any two points of the point cloud is established by exhaustively going through every pair of points. Let this shortest distance be $d_0$. Then, the radius is set to be lambda times $d_0$ where lambda is often set to 5.

When it is desired to determine the orientation of a feature, the radius can be determined from the ball regions determined in the feature detection method of the type described, for example, with reference to FIG. 8.

In step S611, the nodes to be evaluated are determined in the same manner as described with reference to step S109 of FIG. 3. In step S613, the covariance matrix of all points within the region is computed using the stored, zeroth, first and second order moments. In step S615, the orientation is then estimated as the three Eigen vectors of the covariance matrix.

In step S617, a check is performed to see if the process has been performed for all points. If not, and there are more points for which an estimate of the orientation is required, a new point is selected in step S619 and the process loops back to step S609 where a new region is constructed. In step S621, the estimated orientations are outputted.

In an embodiment, any of the above methods taught in FIGS. 3 to 13 can be implemented in a mobile device, for example, a mobile telephone, tablet, wearable technology etc. Such methods can form part of other applications, for example, augmented reality, gesture recognition, object recognition, object registration, pose estimation of objects or the mobile device, navigation and/or games.

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of methods and systems described herein may be made without departing from the spirit of the inventions. The accompanying claims and their equivalents are intended to cover such forms of modifications as would fall within the scope and spirit of the inventions.

The invention claimed is:

1. A system comprising:
a point cloud receiver configured to receive a point cloud comprising a plurality of points, each point representing a spatial point in an image;
a processor configured to:
arrange the points into a hierarchical search tree, with a lowest level comprising a plurality of leaf nodes, where each leaf node corresponds to a point of the point cloud, the search tree comprising a plurality of hierarchical levels with tree nodes in each of the hierarchical levels, the nodes being vertically connected to each other though the hierarchy by branches, wherein at least one moment of a property of the descendant nodes is stored in each tree node;
determine geometric information of the points located within a region, by identifying the highest level tree nodes where all of the descendent leaf nodes are contained within the region and selecting the leaf nodes for the points where no sub-tree is entirely contained within the region, such that the points falling within the region are represented by the smallest number of nodes and performing statistical operations on the nodes representing the points in the region, the statistical operations being determined from the moments of the properties stored within the identified tree nodes, wherein zeroth order, first order, and second order moments of the position of the points are stored in the nodes, and the geometric information includes descriptors of features in the point cloud;
calculate a covariance matrix from the moments stored within the nodes for the points in a region defined around a selected point and determining a descriptor from said covariance matrix; and
compare the feature descriptors with a database of feature descriptors for a plurality of objects.

2. A method of object recognition and/or registration, the method comprising:
receiving a point cloud, comprising a plurality of points, each point representing a spatial point in an image;
arranging the points into a hierarchical search tree, with a lowest level comprising a plurality of leaf nodes, where each leaf node corresponds to a point of the point cloud, the search tree comprising a plurality of hierarchical levels with tree nodes in each of the hierarchical levels, the nodes being vertically connected to each other though the hierarchy by branches, wherein at least one moment of a property of the descendant nodes is stored in each tree node;
determining geometric information of the points located within a region, by identifying highest level tree nodes where all of the descendent leaf nodes are contained within the region and selecting the leaf nodes for the points where no sub-tree is entirely contained within the region, such that the points falling within the region are represented by the smallest number of nodes and performing statistical operations on the nodes representing the points in the region, the statistical operations being determined from the moments of the properties stored within the identified tree nodes, wherein zeroth order, first order, and second order moments of the position of the points are stored in the nodes, and the geometric information includes descriptors of features in the point cloud;
calculating a covariance matrix from the moments stored within the nodes for the points in a region defined around a selected point and determining a descriptor from said covariance matrix; and
comparing the feature descriptors with a database of feature descriptors for a plurality of objects.

3. A non-transitory computer-readable storage medium storing computer readable instructions for controlling the computer to perform the method of claim 2.

4. The method according to claim 2, wherein the property is at least one selected from position, normal vector, colour, curvature, intensity or transparency.

5. The method according to claim 2, wherein the geometric information includes at least one selected from: number of points; mean of positions; mean of colour; mean of normal vectors; mean of intensity; covariance of positions; covariance of normal vectors; covariance of colour; variance of curvature; and variance of intensity.

6. The method according to claim 2, wherein the moments are selected from the zeroth order, first order, second order, or any higher order moments.

7. The method according to claim 2, further comprising filtering the point cloud by replacing the position of every point in the point cloud with the mean of its neighbouring points, the neighbouring points falling within a distance defined by the region, wherein the geometric information includes the mean of the neighbouring points calculated from the stored zeroth order and first order moments.

8. The method according to claim 2, wherein the geometric information includes a number of points within a region, the method further comprising estimating the density of the point cloud using the number of points in a region from the stored zeroth order moments divided by the size of the region.

9. The method according to claim 2, wherein the geometric information includes a normal vector of a selected point in the point cloud, the normal vector being determined by calculating the covariance matrix of the points within a region around the selected point from the moments stored within the nodes and the method further comprising determining the normal from the third eigenvector of the covariance matrix.

10. The method according to claim 2, wherein the geometric information includes an orientation of the surface of a point cloud at a selected point, the orientation being determined by calculating the covariance matrix of the points within a region around the selected point from the moments stored within the nodes and deriving the orientation from the 3 eigenvectors of the covariance matrix.

11. The method according to claim 2, wherein the geometric information includes a location of a feature in the point cloud, the method further comprising calculating the covariance matrix and determining a score from an eigenvalue of said covariance matrix, wherein features are deemed to be located at selected points on the basis of their score.

12. The method according to claim 11, wherein the covariance matrix has three eigenvalues and the lowest eigenvalue is assigned as the score.

13. The method according to claim 11, wherein said region is a first ball having a first radius, and a selected point is analysed by constructing a first ball and a second ball having a second radius around said point, where the second radius is larger than the first radius, wherein each of the points in the point cloud within the second ball for a selected point are analysed by constructing first balls around these points and calculating the score for each point.

14. The method according to claim 13, wherein the feature location is determined to be at the point with the largest score calculated for said first ball.

15. The method according to claim 11, wherein a descriptor is derived for an identified feature, said descriptor being the first ball and the 3D orientation for the first ball determined for the point where the feature is located.

16. The method according to claim 2, configured for analysing the point map to produce feature descriptors for the region, the feature descriptors comprising the geometric information.

17. The method according to claim 7, further comprising sampling the filtered point cloud.

18. The method according to claim 7, further comprising compressing the point cloud by sampling the filtered point cloud.

* * * * *